United States Patent
Oliver

(10) Patent No.: US 7,614,202 B2
(45) Date of Patent: Nov. 10, 2009

(54) SEALER AND INTERCHANGEABLE TOOLING THEREFOR

(75) Inventor: William Michael Oliver, Cincinnati, OH (US)

(73) Assignee: Atlas Vac Machine Co., LLC, Cincinnati, OH (US)

( * ) Notice: Subject to any disclaimer, the term of this patent is extended or adjusted under 35 U.S.C. 154(b) by 0 days.

(21) Appl. No.: 11/945,690

(22) Filed: Nov. 27, 2007

(65) Prior Publication Data

US 2009/0133364 A1    May 28, 2009

(51) Int. Cl.
  *B65B 51/10*    (2006.01)
(52) U.S. Cl. ..................... 53/329.2; 53/300
(58) Field of Classification Search ........... 53/477, 53/286, 300, 329.2, 329.3, 476, 488
See application file for complete search history.

(56) References Cited

U.S. PATENT DOCUMENTS

| | | | |
|---|---|---|---|
| 2,449,139 A | 9/1948 | Power | |
| 2,823,502 A | 2/1958 | Rambold | |
| 2,859,575 A | 11/1958 | Lehmann | |
| 2,888,787 A | 6/1959 | Cloud | |
| 2,918,767 A * | 12/1959 | Grinstead et al. | 53/511 |
| 3,009,304 A * | 11/1961 | Swick | 53/374.8 |
| 3,018,594 A | 1/1962 | Shafer, Jr. et al. | |
| 3,137,111 A * | 6/1964 | Bostrom | 53/329.3 |
| 3,161,525 A | 12/1964 | Hey | |
| 3,196,593 A | 7/1965 | Hey | |
| 3,210,908 A | 10/1965 | Samberg | |
| 3,303,628 A | 2/1967 | Lovas et al. | |
| 3,314,210 A | 4/1967 | Jarund | |
| 3,354,605 A * | 11/1967 | Amberg et al. | 53/412 |
| 3,378,991 A * | 4/1968 | Anderson | 53/329.3 |
| 3,392,506 A * | 7/1968 | Haines | 53/329.3 |
| 3,538,997 A * | 11/1970 | Christine et al. | 198/867.12 |
| 3,662,514 A | 5/1972 | Goss | |
| 3,693,318 A * | 9/1972 | Balzer et al. | 53/329.3 |
| 3,700,292 A * | 10/1972 | Owens | 384/9 |
| 3,807,117 A | 4/1974 | Abrams | |
| 3,818,677 A | 6/1974 | Herbert | |
| 3,823,054 A * | 7/1974 | Balzer et al. | 156/530 |
| 3,882,661 A * | 5/1975 | Schierle | 53/354 |
| 3,937,645 A * | 2/1976 | Ascoli et al. | 156/522 |
| 3,938,302 A | 2/1976 | Donnet | |
| 4,085,560 A | 4/1978 | McCloskey | |
| 4,214,688 A * | 7/1980 | Griffin, Jr. | 224/197 |
| 4,330,977 A | 5/1982 | Focke | |
| 4,510,014 A * | 4/1985 | Artusi et al. | 156/522 |
| 4,553,377 A | 11/1985 | Klinkel | |

(Continued)

OTHER PUBLICATIONS

Product literature, "One-Station Heat Sealing Machine, Model 1SC1216," by Alloyd Company (date of first publication unknown).

(Continued)

*Primary Examiner*—Paul R Durand
(74) *Attorney, Agent, or Firm*—Thompson Hine LLP

(57) ABSTRACT

A sealer including a platen, a support assembly moveable relative to the platen, a guide clip connected to the support assembly, and a tooling assembly having a body defining a notch therein, wherein the notch is engageable by the guide clip to align the tooling assembly relative to the support assembly.

16 Claims, 5 Drawing Sheets

U.S. PATENT DOCUMENTS

| | | | |
|---|---|---|---|
| 4,583,350 A * | 4/1986 | Artusi et al. | 53/478 |
| 4,750,313 A | 6/1988 | Kammler et al. | |
| 4,778,045 A * | 10/1988 | Grune et al. | 198/867.12 |
| 4,782,646 A | 11/1988 | Nantin | |
| 4,819,413 A * | 4/1989 | Mancini | 53/478 |
| 4,833,864 A | 5/1989 | Schnippering et al. | |
| 4,890,759 A | 1/1990 | Scanga et al. | |
| 4,897,985 A | 2/1990 | Buchko et al. | |
| 5,042,540 A * | 8/1991 | Gorlich | 141/174 |
| 5,056,294 A | 10/1991 | Focke | |
| 5,090,180 A | 2/1992 | Sorensen | |
| 5,191,181 A * | 3/1993 | Regenscheid | 219/633 |
| 5,201,163 A | 4/1993 | Reil et al. | |
| 5,426,909 A | 6/1995 | Slocum | |
| 5,484,052 A * | 1/1996 | Pawloski et al. | 198/867.05 |
| 5,488,812 A | 2/1996 | Stark et al. | |
| 5,636,784 A | 6/1997 | Huser | |
| 5,728,249 A | 3/1998 | Kinsey et al. | |
| 5,791,120 A * | 8/1998 | De Young | 53/329.3 |
| 5,802,812 A | 9/1998 | Heudecker | |
| 5,910,138 A | 6/1999 | Sperko et al. | |
| 5,930,977 A * | 8/1999 | Hsu | 53/329.5 |
| 5,946,887 A * | 9/1999 | Lastovich et al. | 53/329 |
| 6,006,913 A | 12/1999 | Ludemann et al. | |
| 6,079,184 A | 6/2000 | Cassou et al. | |
| 6,099,682 A | 8/2000 | Krampe et al. | |
| 6,149,895 A | 11/2000 | Kutsch | |
| 6,241,846 B1 | 6/2001 | Contente et al. | |
| 6,290,801 B1 | 9/2001 | Krampe et al. | |
| 6,357,206 B1 | 3/2002 | Kyle | |
| 6,375,956 B1 | 4/2002 | Hermelin et al. | |
| 6,436,499 B1 | 8/2002 | Krampe et al. | |
| 6,467,238 B1 | 10/2002 | Lees et al. | |
| 6,468,377 B1 | 10/2002 | Sperko et al. | |
| 6,499,271 B1 * | 12/2002 | Lastovich et al. | 53/329.2 |
| 6,536,187 B2 | 3/2003 | Lees et al. | |
| 6,550,224 B2 | 4/2003 | Kleinschmidt | |
| 6,571,534 B2 * | 6/2003 | De Young et al. | 53/329.2 |
| 6,622,457 B2 | 9/2003 | Kurth | |
| 6,655,112 B1 | 12/2003 | Cremer et al. | |
| 6,681,546 B2 * | 1/2004 | DeYoung et al. | 53/329.2 |
| 6,688,080 B2 | 2/2004 | Kinigakis et al. | |
| 6,698,165 B1 | 3/2004 | Natterer | |
| 6,764,567 B2 | 7/2004 | Sperko et al. | |
| 6,846,305 B2 | 1/2005 | Smith et al. | |
| 6,892,508 B2 | 5/2005 | Skinner et al. | |
| 6,949,154 B2 | 9/2005 | Hochrainer et al. | |
| 6,996,951 B2 | 2/2006 | Smith et al. | |
| 7,370,455 B2 * | 5/2008 | Dewey et al. | 53/329.3 |
| 2002/0020500 A1 | 2/2002 | Contente et al. | |
| 2002/0059783 A1 | 5/2002 | Kleinschmidt | |
| 2003/0000632 A1 | 1/2003 | Sperko et al. | |
| 2003/0047467 A1 | 3/2003 | Smith et al. | |
| 2004/0068960 A1 | 4/2004 | Smith et al. | |
| 2004/0219297 A1 | 11/2004 | Raehse et al. | |
| 2004/0262322 A1 | 12/2004 | Middleton et al. | |
| 2005/0079104 A1 | 4/2005 | Polwart et al. | |
| 2005/0089449 A1 | 4/2005 | Polwart et al. | |
| 2005/0129886 A1 | 6/2005 | Gandolphi et al. | |
| 2005/0223676 A1 | 10/2005 | Polster | |
| 2005/0257501 A1 | 11/2005 | Natterer | |
| 2005/0277829 A1 | 12/2005 | Tsonton et al. | |
| 2006/0016158 A1 | 1/2006 | Johansson | |
| 2007/0119124 A1 | 5/2007 | Barthel et al. | |

OTHER PUBLICATIONS

Web page by Alloyd Brands, "Thinking Beyond the Box . . . ," http://www.scapackaging.alloyd.com (date of first publication unknown).

Web page by Alloyd Brands, "Seal Tooling," http://www.scapackaging.alloyd.com (date of first publication unknown).

Web page by Alloyd Brands, "Blister Sealing Machines—The Alloyd Sealing Machines," http://www.scapackaging.alloyd.com (date of first publication unknown).

Screen capture of a web page by Alloyd, http://www.scapackaging.alloyd.com/pdf/Alloyd1SC1216.pdf (date of first publication unknown).

Screen capture of a web page by Alloyd, http://www.scapackaging.alloyd.com/pdf/AERGO2FamilyBrochure.pdf (date of first publication unknown).

Web page by Alloyd Brands, "About Alloyd" http://www.scapackaging.alloyd.com (date of first publication unknown).

* cited by examiner

SEALER AND INTERCHANGEABLE TOOLING THEREFOR

BACKGROUND

The present application relates generally to sealing devices and associated tooling and, more particularly, to heat sealers and interchangeable tooling therefor and means for aligning the interchangeable tooling in the heat sealer.

Sealers, such as heat sealers, are well known in the art for sealing various product packaging, such as medical trays, blister packages, clamshells and the like. Such product packaging typically includes a base and a lid, wherein the base receives the product to be packaged and the lid is sealed to the base to secure the product therein. The lid and the base may be formed as a single piece of packaging material or as separate components.

In a traditional heat sealing process, the base of the product packaging is positioned in a support structure having appropriate tooling, the product is then positioned in the base, the lid is positioned over the base, and the support structure is positioned for engagement by a heated platen. The heated platen is advanced into engagement with the support structure to simultaneously apply heat and pressure to the base and the lid to seal the lid to the base, thereby forming the final sealed package.

The tooling used to receive the packaging base during sealing is typically selected based upon the size and shape of the product being packaged. Therefore, when selecting and positioning appropriate tooling in a sealing device, proper alignment between the tooling and the heated platen is necessary to achieve appropriate sealing results.

Accordingly, there is a need for a heat sealer having interchangeable tooling, wherein the tooling is properly aligned with the heated platen when positioned in the heat sealer. Furthermore, there is a need for heat sealer tooling adapted to be used in various heat sealers without presenting the problem of misalignment between the tooling and the heated platen. Still furthermore, there is a need for a heat sealer having interchangeable tooling and means for properly aligning the interchangeable tooling in the heat sealer.

SUMMARY

In one aspect, the disclosed sealer may include a platen, a support assembly moveable relative to the platen, a guide clip connected to the support assembly, and a tooling assembly having a body defining a notch therein, wherein the notch is engageable by the guide clip to align the tooling assembly relative to the support assembly.

In another aspect, the disclosed sealer may include a housing, a platen positioned in the housing and moveable relative to the housing between a disengaged position and an engaged position, a support assembly moveable relative to the housing between a loading position, wherein at least a portion of the support assembly is generally external of the housing, and an engaged, wherein at least a portion of the support assembly is disposed within the housing, the support assembly defining an opening therein, a guide clip connected to the support assembly, and a tooling assembly having a body defining a notch and at least one compartment therein, wherein at least a portion of the body is received through the opening and at least a portion of the guide clip is received in the notch to align the tooling assembly relative to the support assembly.

In another aspect, the disclosed tooling alignment system may include a support assembly having a guide clip connected thereto and a tooling assembly having a notch formed therein, wherein the notch is sized and shaped to closely receive at least of portion of the guide clip when the tooling assembly is supported on, and properly aligned with, the support assembly, Other aspects of the disclosed sealer with interchangeable tooling and associated systems and methods will become apparent from the following description, the accompanying drawings and the appended claims.

DETAILED DESCRIPTION

Figure 1:
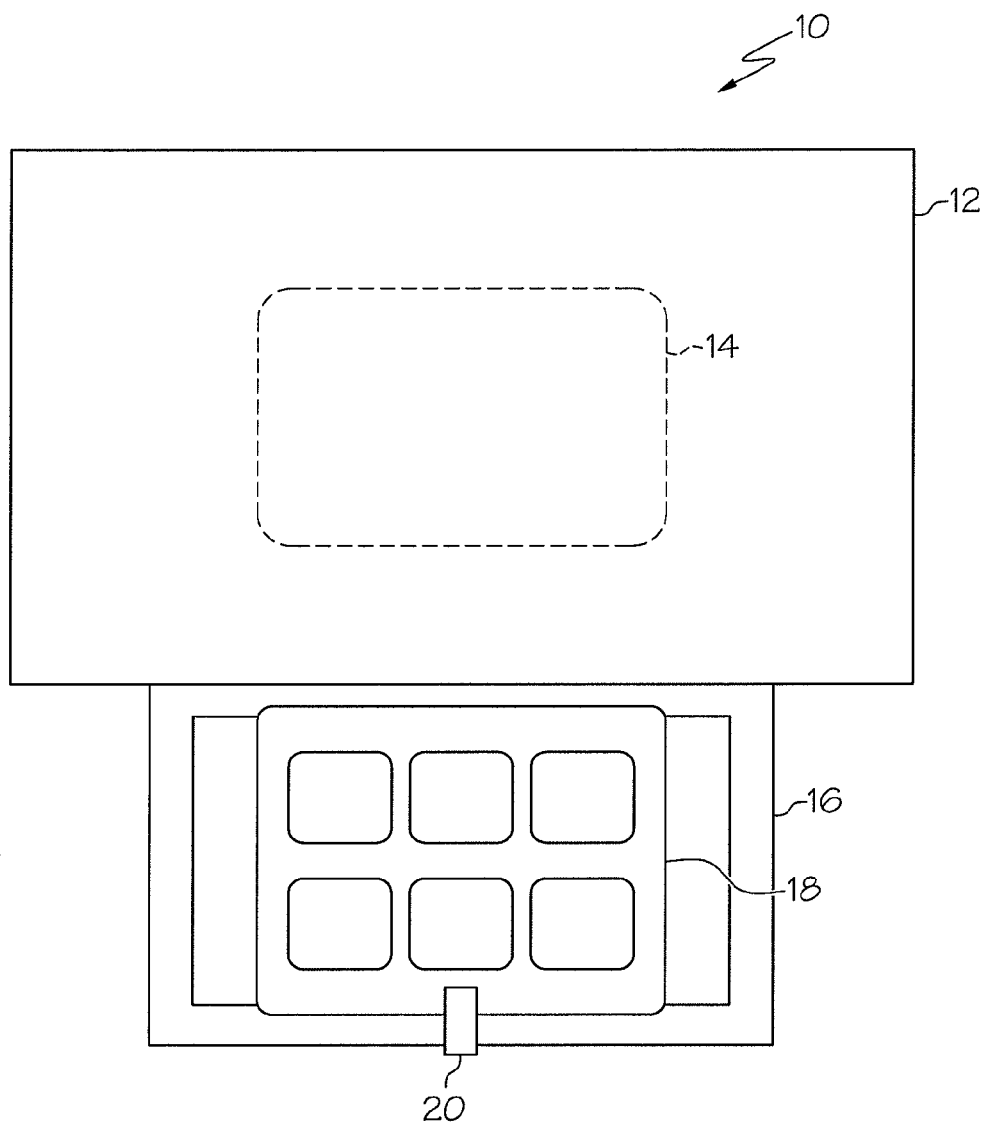
FIG. 1 is a top plan view of one aspect of the disclosed sealer with interchangeable tooling.

Referring to FIG. 1, one aspect of the disclosed sealer with interchangeable tooling, generally designated 10, may include a sealer housing 12, a platen 14, a support assembly 16, a tooling assembly 18, also referred to as tooling, and a guide clip 20. The platen 14 may be a heated platen and may be moveably positioned within the sealer housing 12. In particular, the platen 14 may be moveable from a withdrawn or disengaged position to an engaged position in which the platen 14 has been advanced into close engagement with the tooling 18 to apply pressure and, optionally, heat to product packaging (not shown) positioned in the tooling 18.

The support assembly 16 may be any support structure that receives and supports the tooling 18 and counteracts the downward force applied to the tooling 18 by the platen 14 during sealing. The support assembly 16 may be moveable relative to the housing 12 by various means such that the support assembly 16, or a portion thereof, may be generally external of the housing 12 to facilitate loading, and generally internal of the housing 12 during a sealing operation.

In one aspect, the support assembly 16 may be a reciprocating shuttle that is moveable along a shuttle track (not shown) or the like between a loading position and an engaged position. In the loading position, the shuttle, or a portion thereof, may be generally external of the housing 12 such that a user may load the tooling 18 with various packaging substrates and products to be sealed. In the engaged position, the shuttle, or a portion thereof, may be positioned generally within the housing 12 such that the tooling 18 positioned in the shuttle may be aligned with the platen 14.

Figure 2:
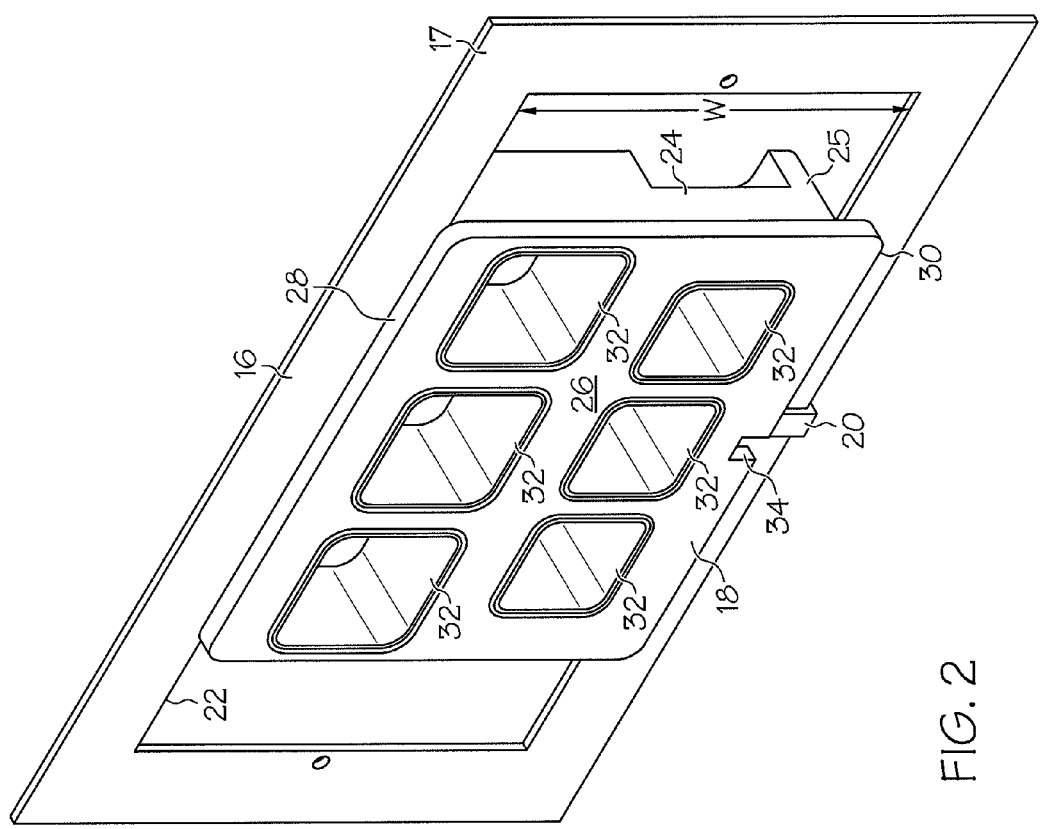
FIG. 2 is a perspective view of a shuttle plate of the heat sealer of FIG. 1 receiving a first tooling assembly therein.

Referring to FIG. 2, the support assembly 16 may be a generally rigid, planar piece of material and may define an inner opening 22 therein for receiving tooling 18. Those skilled in the art will appreciate that the size and shape of the opening 22 may be dictated by the size and shape of the tooling 18 intended to be received by the support assembly 16. For example, the opening 22 may be generally rectangular in shape and may have dimensions of about 15 inches by about 29 inches. Examples of appropriate materials for forming the support assembly 16 include metals, such as aluminum and aluminum alloys.

Still referring to FIG. 2, the tooling 18 may include a body 24 having an upper surface 26, flanges 28, 30, one or more compartments 32 and a notch 34. The flanges 28, 30 may extend generally outwardly from the upper surface 26 of the body 24. The compartments 32 may be formed in the body 24 and may be sized and shaped to receive various packaging components (e.g., the base of a clamshell) therein. Tooling 18, and in particular, the compartments 32 formed therein, may be adapted for a specific type of product packaging.

Figure 3:
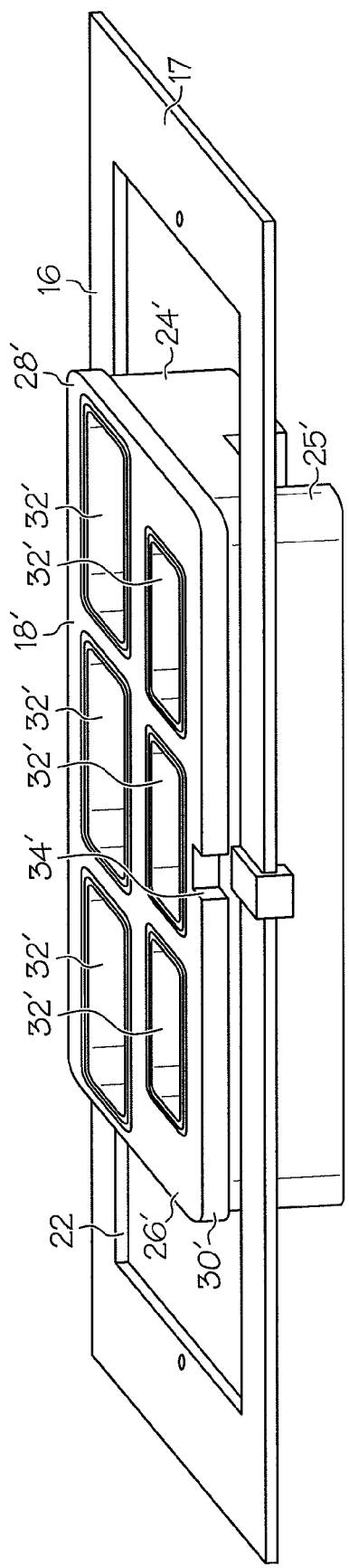
FIG. 3 is a perspective view of the shuttle plate of the heat sealer of FIG. 1 receiving a second tooling assembly therein.

Referring to FIG. 3, alternative, interchangeable tooling 18' may be used with the disclosed sealer 10. Like tooling 18 (FIG. 2), tooling 18' may include a notch 34', one or more compartments 32', a body 24' having an upper surface 26', and flanges 28', 30' extending outwardly from the upper surface 26' of the body 24'. The compartments 32' may have a different size and/or shape than the compartments 32 (FIG. 2) and may be adapted for sealing a different type of product packaging.

Referring now to FIGS. 2 and 3, the tooling 18, 18' may be formed from a generally rigid material, such as aluminum or aluminum alloy, that is capable of withstanding the forces exerted by the platen 14. For example, the tooling 18, 18' may be formed from a solid block of aluminum using a computer numerical control ("CNC") machining process, thereby providing tooling 18, 18' that has a substantially flat upper surface 26, 26' with optimal dimensional accuracy.

The lower portion 25, 25' of the body 24, 24' of the tooling 18, 18' may be sized and shaped to pass through the opening 22 in the support assembly 16, while the flanges 28, 30, 28', 30' may extend sufficiently outwardly from the body 24, 24' to engage the upper surface 17 of the support assembly 16. Therefore, the tooling 18, 18' may be supported by the support assembly 16.

In a specific example, the opening 22 in the support assembly 16 may have a width W and the width of the lower portion 25, 25' of the body 24, 24' of the tooling 18, 18' may be less than the width W of the opening 22. However, the flanges 28, 30, 28', 30' may extend beyond the width W of the opening 22 such that the tooling 18, 18' is supported on the support assembly 16.

Figure 5:
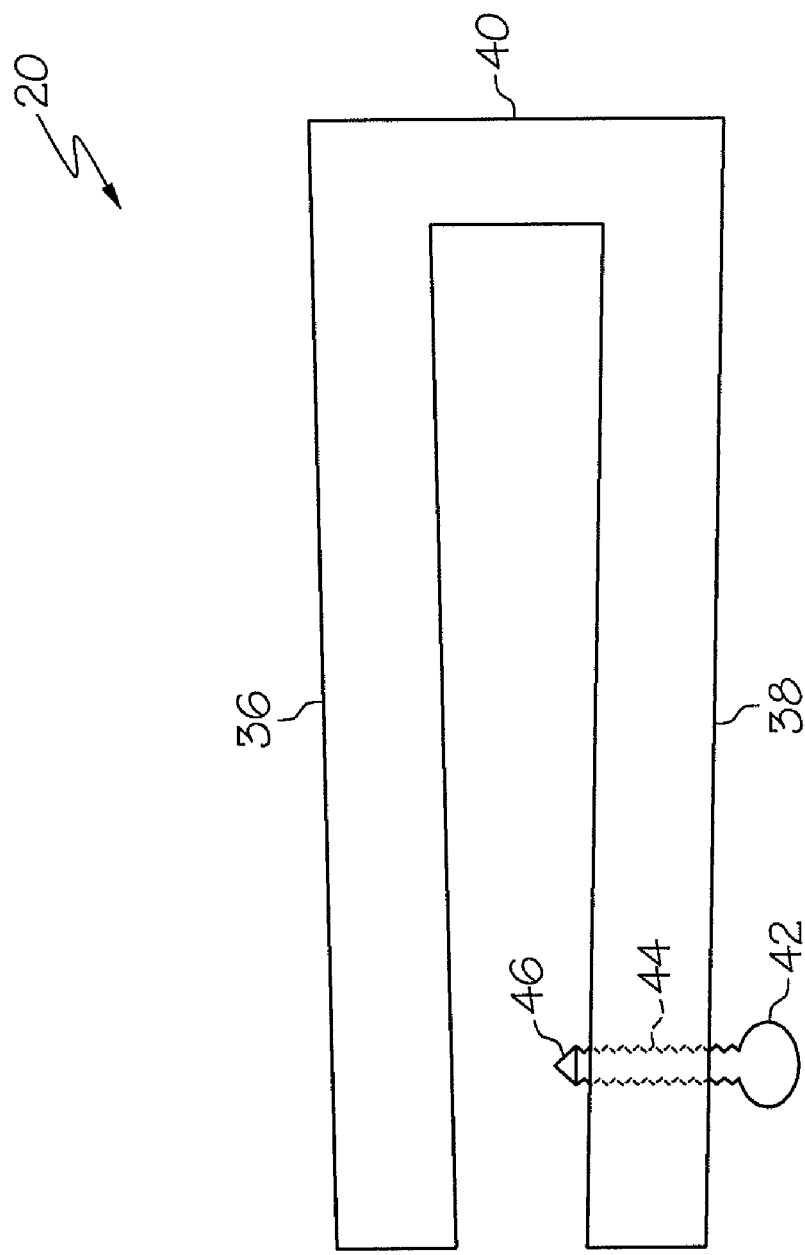
FIG. 5 is a side elevational view of a guide clip of the heat sealer of FIG. 1.

Referring to FIG. 5, the guide clip 20 may include two legs 36, 38 extending from a spacer 40. One or more of the legs 36, 38 of the guide clip 20 may be sized and shaped to closely engage the notch 34, 34' in the tooling 18, 18'. The spacing between the distal ends of the legs 36, 38 may be less than the spacing between the proximal portions of the legs 36, 38 such that the guide clip 20 may apply a pinching force to a body (e.g., support assembly 16) positioned between the legs 36, 38. Optionally, a locking screw 42 may be threaded through a threaded recess 44 in the leg 38. The locking screw 42 may include a distal end 46 adapted to engage the body positioned between the legs 36, 38.

While guide clip 20 is illustrated and discussed as having a particular structure and function, those skilled in the art will appreciate that various types and styles of guide clips may be used to engage the notch 34, 34' in the tooling 18, 18' as disclosed herein without departing from the scope of the present disclosure. Furthermore, those skilled in the art will appreciate that the guide clip 20 may be integral with the support assembly 16.

Figure 4:
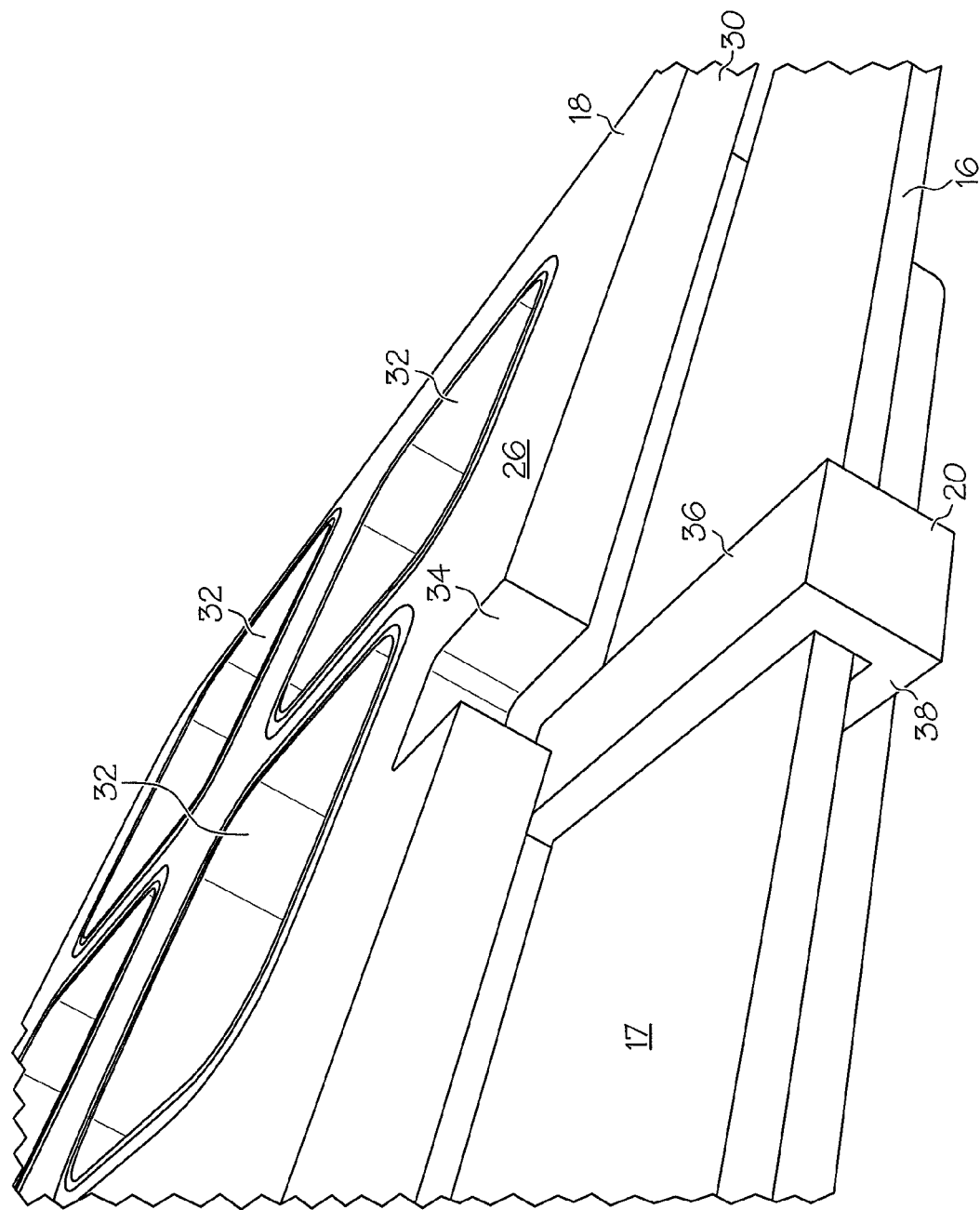
FIG. 4 is a detailed perspective view of a portion of the shuttle plate and the first tooling assembly of FIG. 2.

As shown in FIGS. 2-4, the guide clip 20 may be connected to the support assembly 16 at a specific location on the support assembly 16. For example, as discussed above, the guide clip 20 may be connected to the support assembly 16 by way of the pinching force exerted by the guide clip 20 and/or by engaging the support assembly 16 with the locking screw 42. Furthermore, those skilled in the art will appreciate that the connection between the guide clip 20 and the support assembly 16 may be generally permanent or semi-permanent by, for example, welding the guide clip 20 onto the support assembly 16.

Thus, when the tooling 18, 18' is positioned into engagement with the support assembly 16, the notch 34, 34' in the tooling 18, 18' may be engaged by the guide clip 20, thereby ensuring that the tooling 18, 18' is properly aligned relative to the support assembly 16. It will be appreciated that proper alignment of the tooling 18, 18' relative to the platen 14 may be achieved by ensuring proper alignment of the tooling 18, 18' relative to the support assembly 16.

At this point, those skilled in the art will appreciate that various tooling 18, 18' may be prepared for use with a given sealer 10. Furthermore, those skilled in the art will appreciate that the use of a guide clip 20 to achieve alignment, as disclosed herein, allows for the use of tooling 18, 18' that is substantially smaller than the support assembly 16, thereby reducing the amount of materials and processing required to construct useful tooling 18, 18' and ultimately reducing costs.

Although various aspects of the disclosed sealer with interchangeable tooling have been shown and described, modifications may occur to those skilled in the art upon reading the specification. The present application includes such modifications and is limited only by the scope of the claims.

What is claimed is:

1. A sealer comprising:
   a housing;
   a platen positioned in said housing and moveable relative to said housing between a disengaged position and an engaged position;
   a support assembly moveable relative to said housing between a loading position, wherein at least a portion of said support assembly is generally external of said housing, and an engaged, wherein at least a portion of said support assembly is disposed within said housing, said support assembly defining an opening therein;
   a guide clip including two legs extending from a spacer, wherein said guide clip is connected to said support assembly such that at least a portion of said support assembly is received between said two legs of said guide clip; and
   a tooling assembly having a body defining a notch and at least one compartment therein, wherein at least a portion of said body is received through said opening and at least a portion of said guide clip is received in said notch to align said tooling assembly relative to said support assembly.

2. The sealer of claim 1 wherein said platen is a heated platen.

3. The sealer of claim 1 wherein said guide clip includes a locking screw threaded through one of said legs.

4. The sealer of claim 1 wherein said tooling assembly includes at least one flange extending from said body.

5. A tooling alignment system comprising:
   a support assembly having a guide clip connected thereto, said guide clip including two legs extending from a spacer, wherein said guide clip is connected to said support assembly such that at least a portion of said support assembly is received between said two legs of said guide clip; and
   a tooling assembly having a notch formed therein, wherein said notch is sized and shaped to closely receive at least of portion of said guide clip when said tooling assembly is supported on, and properly aligned with, said support assembly.

6. A sealer comprising:
   a platen;

a support assembly moveable relative to said platen;

a guide clip connected to said support assembly, wherein said guide clip includes two legs extending from a spacer; and a plurality of interchangeable tooling assemblies, each tooling assembly of said plurality having a body defining a notch therein, wherein said notch is engageable by said guide clip to align said tooling assembly relative to said support assembly.

7. The sealer of claim 6 wherein said platen is a heated platen.

8. The sealer of claim 6 wherein said platen is moveable between a disengaged position and an engaged position, said platen applying pressure to said tooling assembly when in said engaged position.

9. The sealer of claim 6 further comprising a housing, said platen being disposed within said housing and said support assembly being moveable between a loading position in which at least a portion of said support assembly is generally external of said housing, and an engaged position in which said tooling assembly is supported by said support assembly and generally aligned with said platen.

10. The sealer of claim 6 wherein said support assembly is a reciprocating shuffle.

11. The sealer of claim 6 wherein said support assembly defines an opening therein and a portion of said body of said tooling assembly is received through said opening.

12. The sealer of claim 6 wherein said guide clip includes a locking screw threaded through one of said legs.

13. The sealer of claim 6 wherein at least a portion of said support assembly is received between said two legs of said guide clip.

14. The sealer of claim 6 wherein at least a portion of said guide clip is sized and shaped to be received in said notch.

15. The sealer of claim 6 wherein said tooling assembly includes at least one flange extending from said body.

16. The sealer of claim 6 wherein said body further defines at least one compartment.

\* \* \* \* \*